(12) United States Patent
Sugiyama et al.

(10) Patent No.: US 6,723,270 B1
(45) Date of Patent: Apr. 20, 2004

(54) METHOD FOR MANUFACTURING FILTER MEMBER

(75) Inventors: Kunimoto Sugiyama, Shizuoka (JP); Tadayuki Onoda, Shizuoka (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 81 days.

(21) Appl. No.: 10/009,764

(22) PCT Filed: Jun. 15, 2000

(86) PCT No.: PCT/JP00/03897

§ 371 (c)(1),
(2), (4) Date: Dec. 17, 2001

(87) PCT Pub. No.: WO00/76623

PCT Pub. Date: Dec. 21, 2000

(30) Foreign Application Priority Data

Jun. 15, 1999 (JP) .......................................... P11-168038
Oct. 28, 1999 (JP) .......................................... P11-306519

(51) Int. Cl.[7] .................... B01D 39/14; B29C 39/12
(52) U.S. Cl. ....................... 264/255; 264/266; 264/278; 264/DIG. 48; 55/498; 55/DIG. 5; 210/493.2; 425/125; 425/500
(58) Field of Search ........................... 55/498, DIG. 5; 210/493.2, 497.01; 156/245; 264/255, 266, 267, 274, 275, 278, DIG. 48; 425/125, 500

(56) References Cited

U.S. PATENT DOCUMENTS

| 2,893,058 A | * | 7/1959 | Wurtz et al. .................... 425/35 |
| 4,028,042 A | * | 6/1977 | Goodfellow et al. ......... 425/515 |
| 4,171,564 A | * | 10/1979 | Acton et al. ................ 29/623.2 |
| 4,878,930 A | * | 11/1989 | Manniso et al. ............... 55/493 |
| 5,028,330 A | * | 7/1991 | Caronia et al. ........... 210/493.2 |
| 5,164,136 A | * | 11/1992 | Comert et al. ............... 264/232 |
| 5,698,059 A | | 12/1997 | Bilski et al. |

FOREIGN PATENT DOCUMENTS

| GB | 1 327 382 | 8/1973 |
| JP | 57-122154 | 7/1982 |
| JP | 61-245817 | 11/1986 |

* cited by examiner

Primary Examiner—Frank M. Lawrence
(74) Attorney, Agent, or Firm—Young & Thompson

(57) ABSTRACT

A principal object of the present invention is to provide a method for manufacturing a filter element having a resin-molded frame, which permits to easily form the resin-molded frame, even when the filter has a complicated shape. The above-mentioned object can be achieved by providing the method for manufacturing the filter element, which is characterized by comprising the steps of: semi-curing resin in a prescribed shape to prepare a semi-cured resin; inserting forcedly at least one part of a filter into the semi-cured resin; and curing the semi-cured resin into which the at least one part of the filter has been forcedly inserted.

4 Claims, 3 Drawing Sheets

METHOD FOR MANUFACTURING FILTER MEMBER

This application is a 371 of international application No. PCT/JP00/03897, filed on Jun. 15, 2000, which designated the United States of America.

TECHNICAL FIELD

The present invention relates to a method for manufacturing a filter element, in which a retaining member and the other members such as a sealing member made of resin are secured to a filter.

BACKGROUND OF THE INVENTION

In general, a filter such as an air filter and an oil filter is secured to a member having a high rigidity, such as a retaining member to compose a filter element to be used. Because the filter as manufactured is formed of material having a relatively low rigidity such as filter paper, and it is therefore difficult to mount such a filter by itself to the other member or provide a sufficient air-tightness between the filter and the other member.

In view of easy formability, resin is normally used for forming the above-mentioned member having a high rigidity. An insert injection is often applied to secure the rigid member on the filter.

Such an insert injection can be applied to manufacture of the filter having a simple shape. However, the insert injection may not be applied to manufacture the filter having a complicated shape. More specifically, some consideration is needed to bring the filter into contact with the mold so as to prevent resin from spreading over any portions of the filter, excluding its portions to which resin body is to be formed. The complicated shape of the filter however leads to complication of the mold. There may be a case in which the mold cannot be formed due to its complexity, causing a problem. When an attempt is made to form a resin-molded body on each of the opposite ends of a tubular filter having a complicated shape such as a chrysanthemum shape by the insert injection, a mold placed in the filter cannot be removed, thus causing a problem. It is substantially impossible to apply the insert injection to the opposite ends of such a filter.

DISCLOSURE OF THE INVENTION

An object of the present invention, which was made in view of the above-mentioned problems, is therefore to provide a method for manufacturing a filter element having a resin-molded frame, which permits to easily form the resin-molded frame, even when the filter has a complicated shape.

In order to attain the aforementioned object, a method of the present invention for manufacturing a filter element, comprises the steps of:

semi-curing resin in a prescribed shape to prepare a semi-cured resin;

inserting forcedly at least one part of a filter into said semi-cured resin; and curing said semi-cured resin into which said at least one part of said filter has been forcedly inserted.

According to the present invention, a part of the filter is inserted into the semi-cured resin, and then, the semi-cured resin is completely cured. As a result, a mold, which provides a prescribed shape of resin during semi-curing the resin, suffices. A complicated shape of the filter does not lead to complication of the mold. It is therefore possible to form a molded body of resin, leading to an easy manufacture of the filter element at a low cost, even when the filter has a complicated shape.

The filter element of the present invention may preferably be applicable in case where the filter is a tubular filter and at least one part of the filter, which is to be forcedly inserted into the semi-cured resin, is opposite ends of the tubular filter. It has been substantially impossible to apply the insert injection to the opposite ends of the tubular filter, especially the tubular filter having the complicated shape to form a molded resin. It is therefore possible to apply the present invention to formation of the molded resin on the opposite ends of the tubular filter, thus putting the technical effects of the present invention to practical use.

In the method of the present invention for manufacturing the filter element, the above-mentioned resin and material for the filter may preferably be formed of same material. The feature that the above-mentioned resin, i.e., a member (such as an outer frame), which is formed on a part of the filter and has a high rigidity, and the material for the filter are formed of the same material, makes it unnecessary to separate the filter from the outer frame or the other structural component, when the filter element is recycled. It is therefore possible to recycle the filter element as it is, thus leading to an effective recycling system.

Another object of the present invention is to provide the filter element, which is manufactured by carrying out the above-mentioned method for manufacturing the filter element. A mold for such a filter element is simpler than a mold for the conventional filter element in which the molded resin is formed by the insert injection, thus reducing the manufacturing cost of the mold. No time is required to remove the mold, providing advantages in costs. In addition, it is possible to form the resin frame on the filter having a complicated shape such as a chrysanthemum shape so as to provide the filter element in which supporting members made of resin are formed on the opposite ends of the filter, although such a formation of the resin frame cannot be performed by the conventional technique.

Further another object of the present invention is to provide a mold for manufacturing a filter element, comprises:

a supporting member for supporting a filter so that at least one part of said filter is exposed; and a semi-curing mold member for semi-curing resin in a prescribed shape, said semi-curing mold section having a holding section for holding at least a semi-cured resin and a removable section, which is removed to expose at least one part of said semi-cured resin, said removable section being disposed between an exposed part of said filter and said holding section, and said holding section being disposed so that said exposed part of said filter comes into contact with an exposed-part of said semi-cured resin, after removal of said removable section.

According to such a mold, it is possible to insert quickly the part of the filter into the semi-cured resin during semi-curing the resin, to form the molded resin, even when the resin has a relatively short curing time. More specifically, resin is first supplied into the semi-curing mold member. Then, the resin is semi-cured into a semi-cured state. After completion of the semi-curing step, the removable section of the semi-curing mold member is removed. Removal of the removable section causes the part of the filter, which is exposed from the holding section, is placed in a position where the part of the filter can come into contact with the semi-cured resin, which has been exposed through the removal of the removable section. Then, the part of the filter, which is exposed from the holding section, is inserted quickly into the semi-cured resin as exposed. The semi-cured resin is then cured completely. As a result, the molded resin can be formed on the part of the filter in a short period of time. It is therefore possible to easily manufacture the filter element with the use of the mold of the present invention, even when the resin has a relatively short curing time.

The method of the present invention for manufacturing the filter element is characterized by comprising the steps of: semi-curing the resin in the prescribed shape to prepare the semi-cured resin; inserting forcedly at least one part of the filter into the semi-cured resin; and curing the semi-cured resin into which the at least one part of the filter has been forcedly inserted. The mold suffices to semi-cure the resin in the prescribed shape, leading to the simple structure, even when the filter has a complicated shape. It is therefore possible to form the molded resin on the filter, thus providing effects of manufacturing easily the filter element at a low cost, even when the filter has a complicated shape.

BEST MODE FOR CARRYING OUT THE INVENTION

Figure 1:
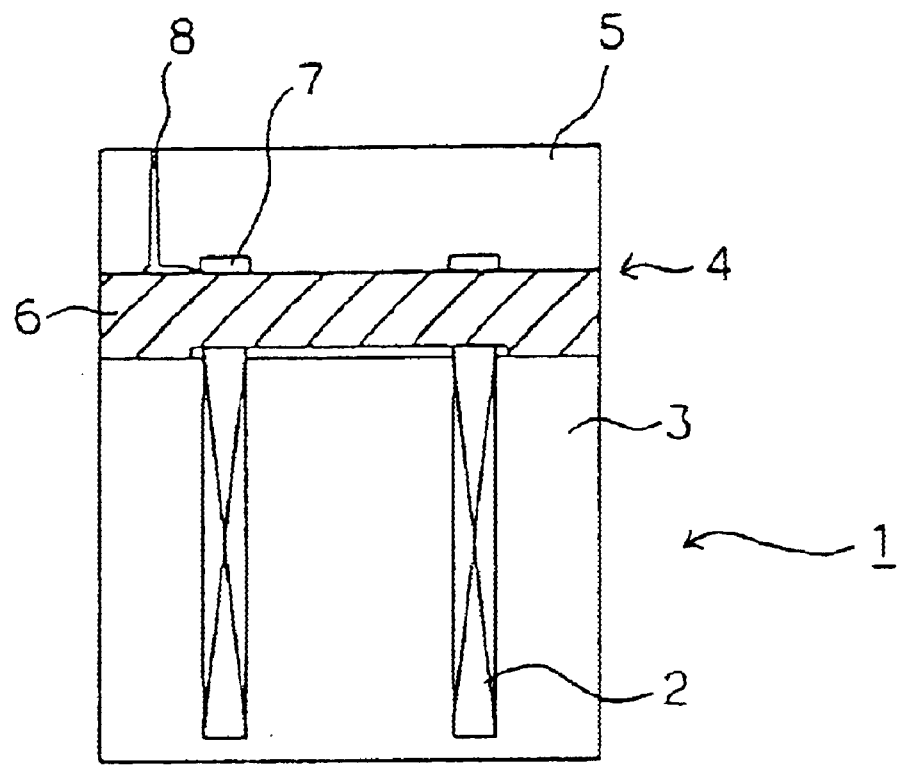
FIG. 1 schematic sectional view illustrating an example of a mold for manufacturing a filter element, which is used in the method of the present invention for manufacturing the filter element.

Now, description will be given in detail below of the method of the present invention for manufacturing a filter element.

The method of the present invention for manufacturing the filter element is characterized by comprising the steps of: semi-curing resin in a prescribed shape to prepare a semi-cured resin; inserting forcedly at least one part of a filter into the semi-cured resin; and curing the semi-cured resin into which the at least one part of the filter has been forcedly inserted.

First, description will be given of the first step, i.e., the step for semi-curing the resin in a prescribed shape. The step for semi-curing the resin in the prescribed shape is conducted by pouring the resin into a metallic mold having a cavity with the prescribed shape and semi-curing it, although the present invention is not limited only to such features. The conventional metallic molding method such as an injection molding and a casting can be applied to the above-mentioned step. The suitable molds for the respective molding methods are applicable as the mold used in the above-mentioned step. The metallic mold may be completely closed or opened on the upper side. It is preferable to use the metallic mold described later for manufacturing the filter element in the present invention, in view of effectiveness and operability of the metallic mold.

There is used, as the resin to be used, resin generally used to form an outer frame of the filter. There may be used any kind of resin, which can be semi-cured, for example, thermosetting resin such as phenol resin, melamine resin and polyurethane resin, and thermoplastic resin such as polyethylene, polypropylene, polyvinyl chloride, acrylonitrile butadiene styrene resin, and (polyolefin, polyurethane or polyester) thermoplastic elastomer (TPE).

In the present invention, it is preferable that the above-mentioned resin and material for forming the filter are formed of the same resin. The above-mentioned feature that the material for forming an outer frame, which has a high rigidity, and the material for forming the filter are formed of the same material, makes it unnecessary to separate the filter from the outer frame, when the filter element is recycled. It is therefore possible to recycle the filter element as it is, thus leading to an effective recycling system.

With respect to the resin, which is applicable in view of the fact that the above-mentioned resin and the resin for forming the filter are formed of the same material, thermoplastic resin is preferable. More specifically, there may be included polyester, polyamide, polypropylene, polyethylene, acetylcellulose, acryl and polyvinyl chloride fiber. Any kind of material, which can be used as both the fiber material and the moldable resin, may be used.

In the present invention, polyester and polyamide, which have widely been used as the moldable resin and material for forming the filer and are low-priced, are especially preferable. Polypropylene and polyethylene, which have widely been used as the moldable resin and material for forming a mesh used for the filter placed in a tank and are low-priced, are also preferable.

With respect to the semi-curing of the resin, in case where the thermosetting resin is used, selection of the resin having a relatively long curing time makes it possible to obtain the resin in the semi-cured state in the middle of a curing reaction of the resin. In case where the thermoplastic resin is used, the resin in the semi-cured state can be obtained by making adjustment of temperature of the metallic mold to maintain a relatively long cooling period of time, after pouring the liquefied resin into the metallic mold.

The above-mentioned prescribed shape means the shape that which is required for the resin, which has been cured completely. If the resin goes from the semi-cured state to the cured state to cause change in shape such as shrinkage of resin, the above-mentioned shape includes such change. Consequently, the above-mentioned prescribed shape means the shape of the frame and/or the other structural components of the filter element as the finished product.

In the second step, a part of the filter is forcedly inserted into the semi-cured resin. The "part" of the filter means its part on which the molded resin is formed. In the preferable embodiment, the part of the filter means the end of the filter, on which a supporting member or a sealing member is provided. In the most preferable embodiment, the part of the filter means the opposite ends of the filter.

In such a second step, the above-mentioned part of the filter is forcedly inserted into the semi-cured resin. In case where the molded resin is formed on each of the opposite ends of the filter, there may be carried out the steps of: inserting forcedly the one end of the filter into the semi-cured resin; curing the semi-cured resin; inserting forcedly the other end of the filter into the other semi-cured resin; and curing the other semi-cured resin. Alternatively, the opposite ends of the filter may be forcedly inserted simultaneously into the separate semi-cured resins, respectively, and these semi-cured resins may be cured completely.

The filter element of the present invention includes any type of the filter element such as the filter element used in a fluid filter, i.e., a fuel filter and an air filter, so long as the resin is used as the outer frame and/or the other structural components. The filter may have any shape such as a panel-shape, a roll-shape and a tubular shape. Applying the present invention to the filter having the complicated shape, to which the conventional insert injection cannot be applied, can fully provide the effects of the present invention, leading to preferable results. It is particularly preferable to apply the present invention to the tubular filter having the complicated shape such as a chrysanthemum shape.

In the present invention, the semi-cured resin into which the part of the filter has been forcedly inserted is finally cured completely. The curing conditions depend on the resin to be used. In case where the thermosetting resin is used, heat may be applied to the resin to cause continuously the curing reaction. In case where the thermoplastic resin is used, the metallic mold may be cooled to cure the resin.

Now, description will be given of the mold for manufacturing the filter element, which is suitably applicable to the method of the present invention for manufacturing the filter element. The mold of the present invention for manufacturing the filter element is characterized by comprising: a supporting member for supporting a filter so that at least one part of said filter is exposed; and a semi-curing mold member for semi-curing resin in a prescribed shape, said semi-curing mold section having a holding section for holding at least a semi-cured resin and a removable section, which is removed to expose at least one part of said semi-cured resin, said removable section being disposed between an exposed part of said filter and said holding section, and said holding section being disposed so that said exposed part of said filter comes into contact with an exposed part of said semi-cured resin, after removal of said removable section.

The above-mentioned mold will be described in detail below with reference to the drawings. FIG. 1 illustrates an example of the mold of the present invention for manufacturing the filter element. The mold 1 for manufacturing the filter element is composed of a supporting member 3 for supporting the filter 2 and a semi-curing mold member 4 for semi-curing the resin in the prescribed shape.

In the example, the supporting member 3, which is designed to support the tubular filter 2, is obtained by forming a groove into which the filter 2 can be inserted, on a cylindrical material. When the filter 2 is inserted in the supporting member 3, the filter 2 is supported so that the one end of the filter is exposed. The supporting member 3 of the present invention may have any structure so long as it supports the filter so that the filter is partially exposed. The supporting member 3 may have the groove, which has the similar shape to the shape of the filter, as shown in FIG. 1. The supporting member 3 may have a structure, which catches a part of the filter so that the opposite ends of the filter are exposed. The principal function of the supporting member is to support the filter. Accordingly, even in a case where the supporting member has the groove into which the filter is to be inserted as shown in FIG. 1, the groove does not need to precisely coincide with the shape of the filter, but may have a rough shape by which the filter can be supported. It is therefore possible to easily manufacture the mold at a low cost in comparison with a mold, which is used in the insert injection.

In the mold 1 as shown in FIG. 1 for manufacturing the filter element, the semi-curing mold member 4, which is composed of a holding section 5 and a removable section 6, is placed on the supporting member 3. The holding section 5 of the semi-curing mold member 4 has a ring-shaped groove 7, by which the semi-cured resin is formed in accordance with the shape of the end of the above-mentioned tubular filter 2. The holding section 5 also has a gate 8 formed thereon, for supplying molten resin into the above-mentioned groove 7. The removable section 6 serving as the other structural component of the mold 1 for manufacturing the filter element comes on its upper surface into contact with the holding section 5 so as to liquid-tightly close the groove 7. The removable section 6 is placed on the supporting member 3 so as to be removable after the groove 7 is filled with the resin and then the resin is semi-cured. Even when the removable section 6 is removed, the semi-cured resin is held in the groove 7.

In the example, the semi-curing mold member 4 is composed of two structural parts, i.e., the holding section 5 and the removable section 6. The present invention is not limited only to such a structure. The semi-curing mold member may be divided into three or more parts so long as it has the holding section for holding the semi-cured resin and the removable section, which is removed to expose the part of the semi-cured resin. Here, the "holding the semi-cured resin" means to hold the semi-cured resin without moving after removal of the removable section, and the above-mentioned "holding" means to hold the semi-cured resin until the part of the filter is forcedly inserted into the semi-cured resin as exposed, after the removal of the removable section.

In the example as shown in FIG. 1, the groove 7 is filled with the resin and the removable section 6 is then removed after the supplied resin is semi-cured. During such a removal operation, the groove 7 for holding the semi-cured resin is placed so as to face the upper end of the filter 2 supported by the supporting member 3. Moving down simply the holding section 5 causes the upper end of the filter 2 to be forcedly inserted into the semi-cured resin in the groove 7.

Figure 2:
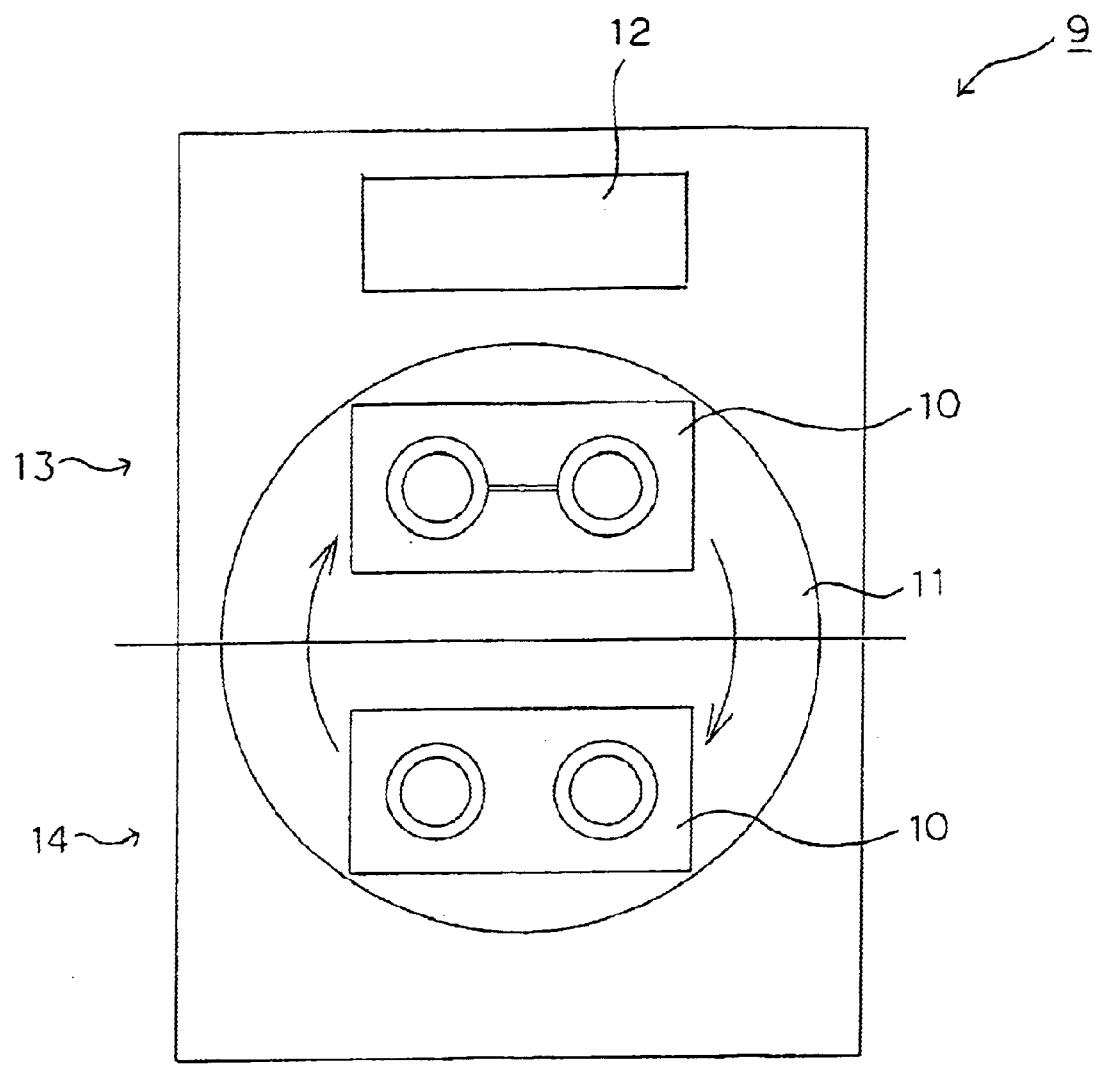
FIG. 2 is a schematic view illustrating an example of a manufacturing apparatus, which is used in the method of the present invention for manufacturing the filter element.
Figure 3A:
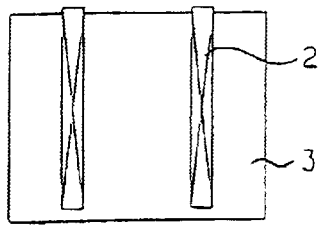
FIG. 3 is a descriptive view illustrating an example of the steps of the method of the present invention for manufacturing the filer element.
Figure 3D:
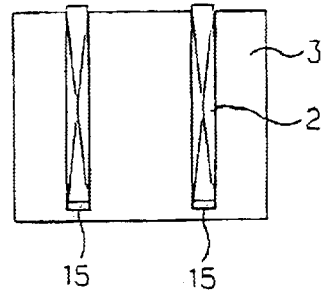
Figure 3B:
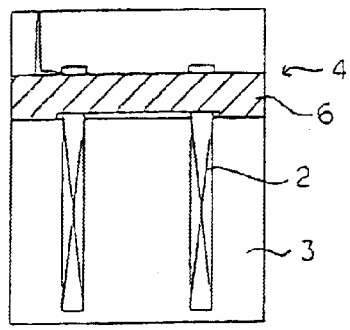
Figure 3E:
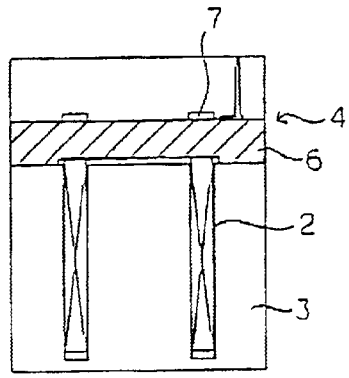
Figure 3C:
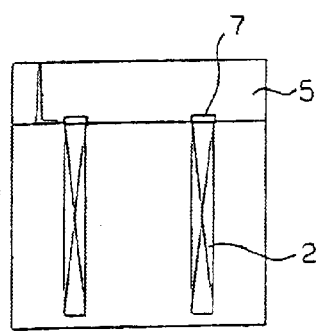
Figure 3F:
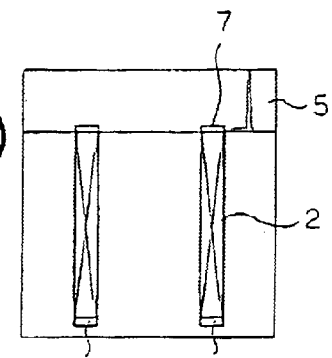
Figure 3G:
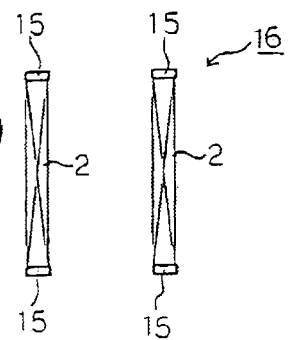

No example of the method of the present invention for manufacturing the filter element, utilizing the above-mentioned mold 1 for manufacturing the filter element will be described with reference to FIGS. 2 and 3. FIG. 2 is a schematic view illustrating the example of the manufacturing apparatus, which is used in the manufacturing method of the present invention. The manufacturing apparatus 9 comprises a turntable 11, on which a mold unit 10 having two molds 1 for manufacturing the filter member can be placed and which is turnable; and a supplying device 12 for supplying the resin into the mold unit 10. The turntable 11 turns to move the mold unit 10, which are placed on the turntable 11, between a formation/insertion area 13 in which the steps of supplying the resin and curing it are carried out and an insertion/reversing area 14 in which the filter is inserted and reversed.

The manufacturing method utilizing the above-mentioned manufacturing apparatus 9 will be described with reference to FIGS. 2 and 3. First, the filter 2 is inserted into the groove of the left-hand supporting member 3 of the mold unit 10, which is placed in the insertion/reversing area 14, so as to hold the filter 2 therein (see FIG. 3(a)). Then, the above-mentioned semi-curing mold section 4 is placed on the supporting member 3 (see FIG. 3(b)). Then, turning the turntable 11 causes the mold unit 10 to move into the formation/insertion area 13. The molten resin is supplied into the left-hand semi-curing mold section 4 of the mold unit 10 as moved, from the supplying device 12. The removable section 6 is removed after the resin in the mold unit 10 is semi-cured (see FIG. 3(c)). Then, the upper end of the filter 2 is forcedly inserted into the semi-cured resin in the groove 7 of the holding section 5. Then, the mold unit 10 is cooled to cure the semi-cured resin completely. The turntable 11 turns to move again the mold unit 10 into the insertion/reversing area 14. The holding section 5 of the mold unit 10 as moved is removed and the filter 2 supported therein is taken out. The filter 2 thus pulled out is turned upside down and then inserted into the groove of the right-hand supporting member 3 so that the end of the filter 2, on which the molded resin 15 has been formed, is directed downward (see FIG. 3(d)). In this case, the new filter may be inserted into the groove of the left-hand supporting member to carry out the steps for manufacturing the next filter element. After the filter 2 is turned upside down and inserted, the semi-curing mold section 4 is placed on the supporting member 3 (see FIG. 3(e)). The turntable 11 turns to move the mold unit 10 into the formation/insertion area 13. The resin is inserted into the groove 7 of the semi-curing mold section 4 with the use of the supplying device 12 in the same manner as described above. The resin is then semi-cured. The removable section 6 is removed so that the other end of the filter 2, on which the molded resin 15 has not as yet been formed, is forcedly inserted into the semi-cured resin (see FIG. 3(f)). After the resin is cured completely, the turntable 11 turns to move the mold unit 10 into the insertion/reversing area 14. Then, the filter 2 is taken out from the supporting member 3. The filter element 16 having the molded resin 15 on the opposite ends thereof is obtained in this manner (see FIG. 3(g)).

The present invention is not limited only to the above-described embodiments. The embodiments are merely described by way of illustration. Any invention, which has the structure based on substantially the same technical idea as that defined in claims and provides the same effects, is included in the technical scope of the present invention.

In the above description, the mold for molding the resin is described as a metallic mold. The mold is however not limited only to the metallic mold, and may be a mold made of resin.

What is claimed is:

1. A method for manufacturing a filter element, comprising the steps of:
    supporting a filter so that at least one part of said filter is exposed;
    semi-curing resin in a prescribed shape to prepare a semi-cured resin through a removable section in a place, which is apart from the exposed part of said filter so as to face the exposed part thereof, and hold it;
    removing the removable section and bringing said semi-cured resin into contact with the exposed part of said filter, to insert forcedly the part of said filter into said semi-cured resin; and
    curing said semi-cured resin into which the part of said filter has been forcedly inserted.

2. The method for manufacturing a filter element as claimed in claim 1, wherein:
    said filter is a tubular filter, and said at least one part of said filter, which is to be forcedly inserted into said semi-cured resin, is opposite ends of said tubular filter.

3. The method for manufacturing a filter element as claimed in claim 1, wherein:
    said resin and material for said filter are formed of same material.

4. A mold for manufacturing a filter element, comprising:
    a supporting member for supporting a filter so that at least one part of said filter is exposed; and
    a semi-curing mold member for semi-curing resin in a prescribed shape, said semi-curing mold section having a holding section for holding at least a semi-cured resin and a removable section, which is removed to expose at least one part of said semi-cured resin, said removable section being disposed between an exposed part of said filter and said holding section, and said holding section being disposed so that said exposed part of said filter comes into contact with an exposed part of said semi-cured resin, after removal of said removable section.

* * * * *